April 18, 1950 L. J. CONN 2,504,501
RIGID SHAFT COUPLER
Filed June 18, 1948
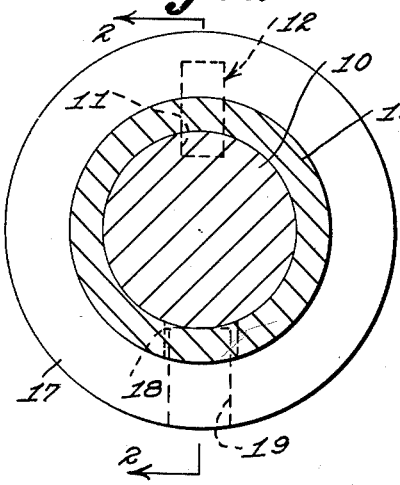
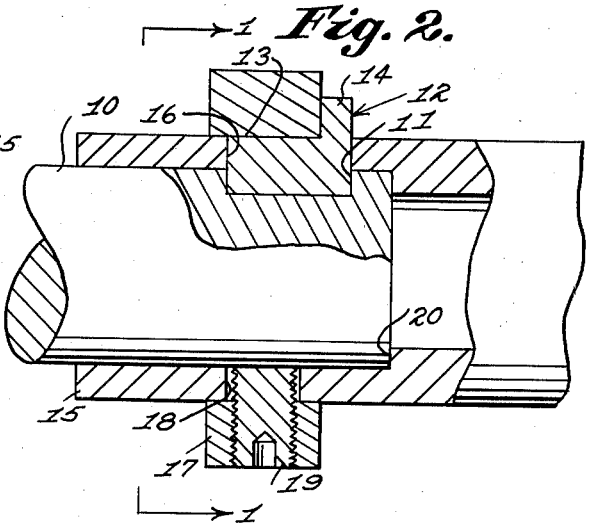
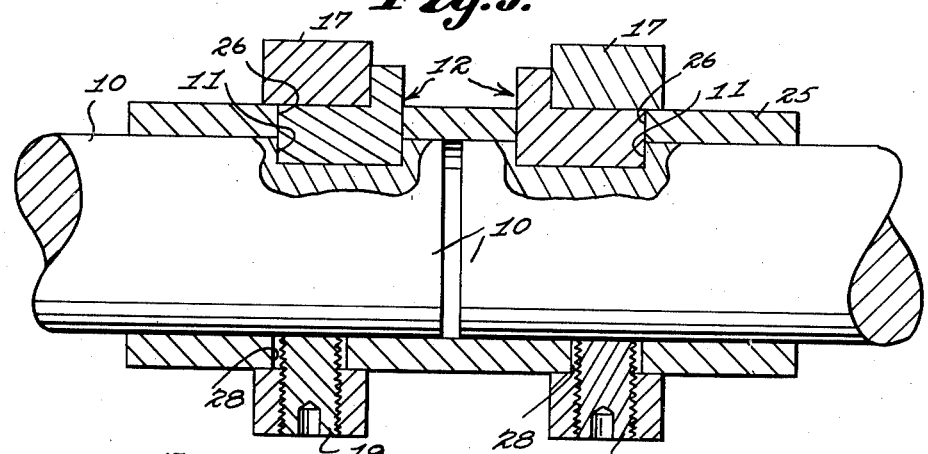
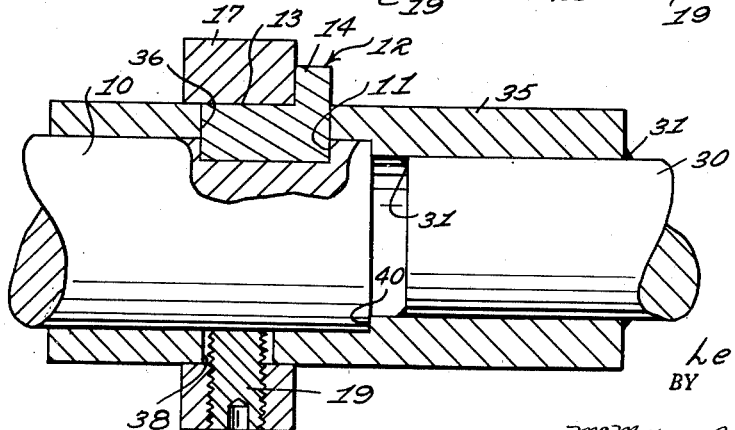
INVENTOR.
Leroy J. Conn
BY
McMorrow, Berman + Davidson
ATTORNEYS Patented Apr. 18, 1950

2,504,501

UNITED STATES PATENT OFFICE 2,504,501

RIGID SHAFT COUPLER

Leroy J. Conn, Clarendon, Pa.

Application June 18, 1948, Serial No. 33,809

4 Claims. (Cl. 287—119)

My invention relates to coupling means, and more particularly to means for rigidly coupling a pair of shafts together in end-to-end relation. However, the device according to the invention is readily adaptable for the coupling together of a shaft and a sleeve in rigid end-to-end relation.

With the foregoing in view, it is an object of my invention to provide an improved rigid shaft coupling.

A further object is to provide an improved rigid shaft coupling which is readily detachably connected together without the use of conventional coupling means.

Other objects and advantages reside in the particular structure of the invention, combination and arrangement of the several parts, and will be readily understood by those skilled in the art upon reference to the attached drawing and in connection with the following specification, wherein the invention is shown, described and claimed.

In the drawing:

Figure 1 is a transverse vertical sectional view through a coupler according to the invention and taken substantially on the plane of the line 1—1 of Figure 2;

Figure 2 is an elevational view with parts shown in longitudinal vertical section substantially on the plane of the line 2—2 of Figure 1;

Figure 3 is a view like Figure 2, but showing a slightly modified form of the construction;

Figure 4 is a view like Figure 3, but showing a further modification of the structure.

In the drawing, wherein like reference characters have been used throughout the several views to designate like parts, and referring at first to the form of invention illustrated in Figures 1 and 2, 10 designates one end of any suitable cylindrical rod. The periphery of the rod 10 is provided with a notch 11 which is adapted to have seated therein the inner end of any suitable key 12. The key 12 according to the invention includes a horizontally-disposed portion including an arcuate periphery 13. Likewise, the key 12 includes a radially outwardly-directed flange 14. In this form of the invention, the end 10 of the rod is telescoped into the bore of a sleeve 15 which may be provided with a shoulder 20 to limit such telescopic movement of the rod into the sleeve. Likewise, the shoulder 20 provides means for registering the notch 11 of the rod end with an aperture 16 formed in the sleeve 15. The key 12 is seated in the notch 11 and extends upwardly through the aperture 16 in the sleeve so that the arcuate surface 13 of the key lies flush with the outer periphery of the sleeve 15. This arrangement permits a ring 17 to be slipped over the sleeve and key jointly seating against the shoulder provided by the flange 14 of the key. Thereafter, any suitable set screw 19 may be extended through an aperture 18 formed in the sleeve 15, whereby the inner end of the set screw 19 may be engaged with the rod end 10 to lock the parts in assembled relation in a manner readily understood.

In the form of invention shown in Figure 3, a pair of rod ends 10 are adapted to be connected together in end-to-end relation. The structure of the parts is identical, except that there are provided two keys 12 and a pair of rings 17 and the associated set screws 19. Also, the sleeve 25 is provided which telescopically engages both rod ends 10. Likewise, the sleeve 25 is provided with a pair of longitudinally-spaced apertures 26 permitting the extension of the keys 12 therethrough and a pair of longitudinally-spaced oversize apertures 28 permitting the passage of the set screws 19 therethrough. Otherwise, the parts work and operate in the same manner as in the first-described form of the invention.

In the form of invention of Figure 4, the parts are again substantially similar to the first-described form, except that a sleeve 35 is welded, as at 31, to one end of a rod 30. The sleeve 35 may be counterbored to provide a shoulder 40 against which the rod end 10 abuts so as to position the notch thereof in alignment with the aperture 36 formed in the sleeve 35 for the key 12. The second aperture 38 is formed in the sleeve 35 for the passage of the set screw 19 therethrough.

In all forms of the invention, to disconnect the coupling, it is only necessary to back off the set screws 19 until their inner ends are slightly outwardly of the periphery of the sleeves 15, 25 or 35, at which time the rings 17 may be slipped off of arcuate surfaces of the key 12, permitting the latter to be withdrawn from the aligned apertures 16, 26 or 36 and the notches 11 on the rod end 10. Thereafter, the rod ends 10 may be readily disconnected from the associated sleeves in a manner readily understood. It follows from the foregoing that the coupling achieved by all forms of the invention prevents relative rotation of the rods to each other or to the associated coupled sleeve. Likewise, the overlapping relation of the sleeves 15, 25 or 35 provides a rigidly reinforced coupling against lateral stresses.

Thus, while I have shown and described what are now thought to be the preferred embodiments of the invention, it is to be understood that the same is susceptible of other forms and expressions. Consequently, I do not limit myself to the precise structures shown and described hereinabove except as hereinafter claimed.

I claim:

1. Means for coupling a rod to a sleeve, comprising a rod formed with a peripheral notch providing a key seat, said sleeve telescopically receiving said rod therein and being formed with an aperture registerable with said seat, a key freely and radially seatable in said aligned aperture and seat, said key and sleeve including outer complementary flush surfaces, a ring slidable on said sleeve into and out of overlying relation to said key whereby to retain the same seated, means for releasably locking said ring in overlying relation to said key, and said key including a radially outwardly-extending portion engageable with said ring to limit sliding of said ring in one direction.

2. In a rigid shaft coupling device including a rod having a radial outwardly opening notch therein and a sleeve formed with a radially extending aperture therethrough for aligning with the notch, a key slidable in the aligned aperture and notch to be seated in said notch and extending through said aperture, an outwardly extending flange on one end of said key, and a locking ring slidably engageable about said sleeve over said key and engaging said flange for retaining said key in enagement with said rod and sleeve.

3. Means for coupling a rod to a sleeve comprising a rod formed with a peripheral key-receiving notch therein, a sleeve slidably engaging over said rod and formed with a key receiving aperture for registering with said notch, a key slidable in said aperture and engaging in said notch, a key-retaining ring slidable about said sleeve and engageable with said key for retaining said key positioned in said sleeve and rod and a ring engaging member on said key engageable with said ring for positioning said ring over said key.

4. Means for coupling a rod to a sleeve comprising a rod formed with a peripheral key-receiving notch therein, a sleeve slidably engaging over said rod and formed with a key-receiving aperture registerable with said notch, a key slidable in said aperture and engaging in said notch, a key-retaining ring slidable about said sleeve and engageable with said key for retaining said key positioned in said sleeve and rod, a ring engaging member on said key engageable with said ring for positioning said ring over said key and means carried by said ring engaging said rod for securing said ring in key retaining position.

LEROY J. CONN.

REFERENCES CITED

The following references are of record in the file of this patent:

UNITED STATES PATENTS

| Number | Name | Date |
| --- | --- | --- |
| 582,464 | Dusenbury | May 11, 1897 |
| 1,169,513 | Royle, Jr. | Jan. 25, 1916 |
| 2,458,740 | Schafer | Jan. 11, 1949 |

FOREIGN PATENTS

| Number | Country | Date |
| --- | --- | --- |
| 275,514 | Great Britain | Aug. 11, 1927 |